US012561881B2

(12) United States Patent
Pan et al.

(10) Patent No.: US 12,561,881 B2
(45) Date of Patent: Feb. 24, 2026

(54) SYSTEM AND METHOD OF MODULATING ANIMATION CURVES

(71) Applicant: JALI INC., Toronto (CA)

(72) Inventors: Yifang Pan, North York (CA); Karan Singh, Toronto (CA); Eugene Fiume, Burnaby (CA); Chris Landreth, Toronto (CA)

(73) Assignee: JALI INC., Toronto (CA)

( * ) Notice: Subject to any disclaimer, the term of this patent is extended or adjusted under 35 U.S.C. 154(b) by 107 days.

(21) Appl. No.: 18/519,317

(22) Filed: Nov. 27, 2023

(65) Prior Publication Data

US 2024/0177391 A1 May 30, 2024

Related U.S. Application Data

(60) Provisional application No. 63/385,382, filed on Nov. 29, 2022.

(51) Int. Cl.
*G06T 13/80* (2011.01)
*G10L 15/02* (2006.01)
*G10L 21/10* (2013.01)

(52) U.S. Cl.
CPC .............. *G06T 13/80* (2013.01); *G10L 15/02* (2013.01); *G10L 21/10* (2013.01); *G10L 2015/025* (2013.01); *G10L 2021/105* (2013.01)

(58) Field of Classification Search
None
See application file for complete search history.

(56) References Cited

U.S. PATENT DOCUMENTS

| | | | | |
|---|---|---|---|---|
| 6,181,351 | B1* | 1/2001 | Merrill | .................... G10L 21/06 |
| | | | | 345/473 |
| 7,827,034 | B1* | 11/2010 | Munns | ..................... G09B 5/00 |
| | | | | 704/275 |
| 8,356,004 | B2 | 1/2013 | Jung et al. | |
| 10,552,667 | B1* | 2/2020 | Bogan, III | .......... G06V 40/171 |
| 10,755,463 | B1* | 8/2020 | Albuz | .................... G10L 13/00 |
| 2006/0122834 | A1 | 6/2006 | Bennett | |
| 2011/0004476 | A1* | 1/2011 | Saino | ................... G10H 1/0008 |
| | | | | 704/267 |
| 2018/0253881 | A1* | 9/2018 | Edwards | ................ G10L 21/10 |
| 2019/0147838 | A1* | 5/2019 | Serletic, II | ........... G10L 13/027 |
| | | | | 704/260 |

(Continued)

OTHER PUBLICATIONS

Extended European Search Report for EU application No. 21857081. 0, EPO, search completed: Jul. 2, 2024, communication dated: Jul. 9, 2024.

(Continued)

*Primary Examiner* — Jeffrey J Chow
(74) *Attorney, Agent, or Firm* — Bhole IP Law; Marc Lampert

(57) ABSTRACT

A system and method of modulating animation curves based on audio input. The method including: identifying phonetic features for a plurality of visemes in the audio input; determining viseme animation curves based on parameters representing a spatial appearance of the plurality of visemes; modulating the viseme animation curves based on melodic accent, pitch sensitivity, or both, based on the phonetic features; and outputting the modulated animation curves.

18 Claims, 11 Drawing Sheets

(56)                 References Cited

U.S. PATENT DOCUMENTS

| | | | |
|---|---|---|---|
| 2021/0056348 A1* | 2/2021 | Berlin | G06N 3/0985 |
| 2021/0110831 A1* | 4/2021 | Shillingford | G06N 3/044 |
| 2024/0203015 A1* | 6/2024 | Liu | G06T 13/40 |
| 2025/0140257 A1* | 5/2025 | Cohen-Or | G10L 15/25 |

OTHER PUBLICATIONS

Edwards, Pif , et al., "Jali", ACM Transactions on Graphics, ACM, NY, US, vol. 35, No. 4, Jul. 11, 2016 (Jul. 11, 2016), pp. 1-11, XP058685001, ISSN: 0730-0301, DOI: 10.1145/2897824.2925984.

International Search Report for PCT application No. PCT/CA2021/051140, CIPO, search completed: Dec. 1, 2021, mailed: Dec. 3, 2021.

Written Opinion of the International Searching Authority for PCT application No. PCT/CA2021/051140, CIPO, opinion completed: Dec. 2, 2021, mailed: Dec. 3, 2021.

"Extended European Search Report for EU application No. 23212758.9, EPO, dated: Mar. 25, 2024."

Edwards, et al., "JALI: An AnimatorCentric Viseme Model for Expressive Lip Synchronization", ACM Transactions on Graphics, ACM, NY, US, vol. 35, No. 4, Jul. 11, 2016 (Jul. 11, 2016), pp. 1-11, ISSN: 0730-0301, DOI: 10.1145/2897824.2925984.

Pan, et al., "VOCAL: Vowel and Consonant Layering for Expressive Animator-Centric Singing Animation", Proceedings of the 25th international conference on model driven engineering languages and systems: compantion proceedings, acmpub27, New York, NY, USA, Nov. 30, 2022 (Nov. 30, 2022), pp. 1-9, DOI: 10.1145/3550469.3555408 ISBN: 978-1-4503-9470-3.

* cited by examiner

200

202 — Capture input audio

204 — Perform forced alignment

206 — Identify intervals of constant pitch and vibrato

208 — Generate one or more sets of viseme curves

210 — Modulating animation curves using MaPs field

212 — Output modulated animation curve

Audio

Lyric

Shot to the heart,
and you're to blame,
You give love a bad
name~~......

**Phoneme
Timing**

Vowel Modification

Consonant Vowel Layering $$t = \max\left(\frac{t_2 + t_1}{2}, t_2 - 0.12\right)$$

$$\alpha = VC \cdot \min(\alpha_1, \alpha_2)$$

SYSTEM AND METHOD OF MODULATING ANIMATION CURVES

TECHNICAL FIELD

The following relates generally to computer animation and more specifically to a system and method of modulating animation curves.

BACKGROUND

There is a strong interest in digital avatars and three-dimensional (3D) facial animation, which illustrates the need for representations and synthesis of all forms of expressive facial communication. Singing, as much as speaking, is a primeval and essential form of human communication. Singing characters appear in most animated films, from early animated content, to blockbuster films. Transforming vocal performances into visual performances can be exceedingly challenging because lip-sync timing and mouth shapes, or visemes, designed for speech visualization are usually ill-suited to singing.

SUMMARY

In an aspect, there is provided a method of modulating animation curves based on audio input, the method executed on a processing unit, the method comprising: identifying phonetic features for a plurality of visemes in the audio input; determining viseme animation curves based on parameters representing a spatial appearance of the plurality of visemes; modulating the viseme animation curves based on melodic accent, pitch sensitivity, or both, based on the phonetic features; and outputting the modulated animation curves.

In a particular case of the method, identifying the phonetic features comprises performing forced alignment to temporally align phonemes to the input audio.

In another case of the method, performing the forced alignment comprises using a trained language model that maps the audio input to phoneme timings.

In yet another case of the method, the method further comprising identifying acoustic features in the audio input, and wherein modulating the viseme animation curves based on melodic accent, pitch sensitivity, or both, is based on the phonetic features and the acoustic features.

In yet another case of the method, identifying the acoustic features comprises identifying intervals of vibrato, constant pitch, or both, using a pitch signal.

In yet another case of the method, the intervals of vibrato are determined by locating intervals with periodic oscillation in the pitch signal.

In yet another case of the method, the melodic accent and the pitch sensitivity are used to modulate the viseme animation curves due to effects on boundary keys that demarcate lip movement before and after the phonation of the viseme and effects on internal keys that control lip movement during phonation.

In yet another case of the method, modulating the viseme animation comprises determining vowel-consonant co-articulation by extending boundary keys for closely spaced vowel visemes and then correcting conflicting keyframes.

In yet another case of the method, the pitch sensitivity is determined using a duration of a vowel relative to an average length of a spoken vowel.

In yet another case of the method, the melodic accent is determined using a spectral high-frequency (HF) energy relative to HF energy of consonants for an extended period.

In another aspect, there is provided a system for modulating animation curves based on audio input, the system comprising a processing unit and a data storage, the data storage comprising instructions for the processing unit to execute: a tagging module to identify phonetic features for a plurality of visemes in the audio input; a curve generation module to determine viseme animation curves based on parameters representing a spatial appearance of the plurality of visemes; a blending module to modulate the viseme animation curves based on melodic accent, pitch sensitivity, or both, based on the phonetic features; and an output module to output the modulated animation curves.

In a particular case of the system, identifying the phonetic features comprises performing forced alignment to temporally align phonemes to the input audio.

In another case of the system, performing the forced alignment comprises using a trained language model that maps the audio input to phoneme timings.

In yet another case of the system, the tagging module further identifies acoustic features in the audio input, and wherein modulating the viseme animation curves based on melodic accent, pitch sensitivity, or both, is based on the phonetic features and the acoustic features.

In yet another case of the system, identifying the acoustic features comprises identifying intervals of vibrato, constant pitch, or both, using a pitch signal.

In yet another case of the system, the intervals of vibrato are determined by locating intervals with periodic oscillation in the pitch signal.

In yet another case of the system, the melodic accent and the pitch sensitivity are used to modulate the viseme animation curves due to effects on boundary keys that demarcate lip movement before and after the phonation of the viseme and effects on internal keys that control lip movement during phonation.

In yet another case of the system, modulating the viseme animation comprises determining vowel-consonant co-articulation by extending boundary keys for closely spaced vowel visemes and then correcting conflicting keyframes.

In yet another case of the system, the pitch sensitivity is determined using a duration of a vowel relative to an average length of a spoken vowel.

In yet another case of the system, the melodic accent is determined using a spectral high-frequency (HF) energy relative to HF energy of consonants for an extended period.

These and other aspects are contemplated and described herein. It will be appreciated that the foregoing summary sets out representative aspects of systems and methods to assist skilled readers in understanding the following detailed description.

BRIEF DESCRIPTION OF THE DRAWINGS

The features of the invention will become more apparent in the following detailed description in which reference is made to the appended drawings wherein.

DETAILED DESCRIPTION

Figure 1:
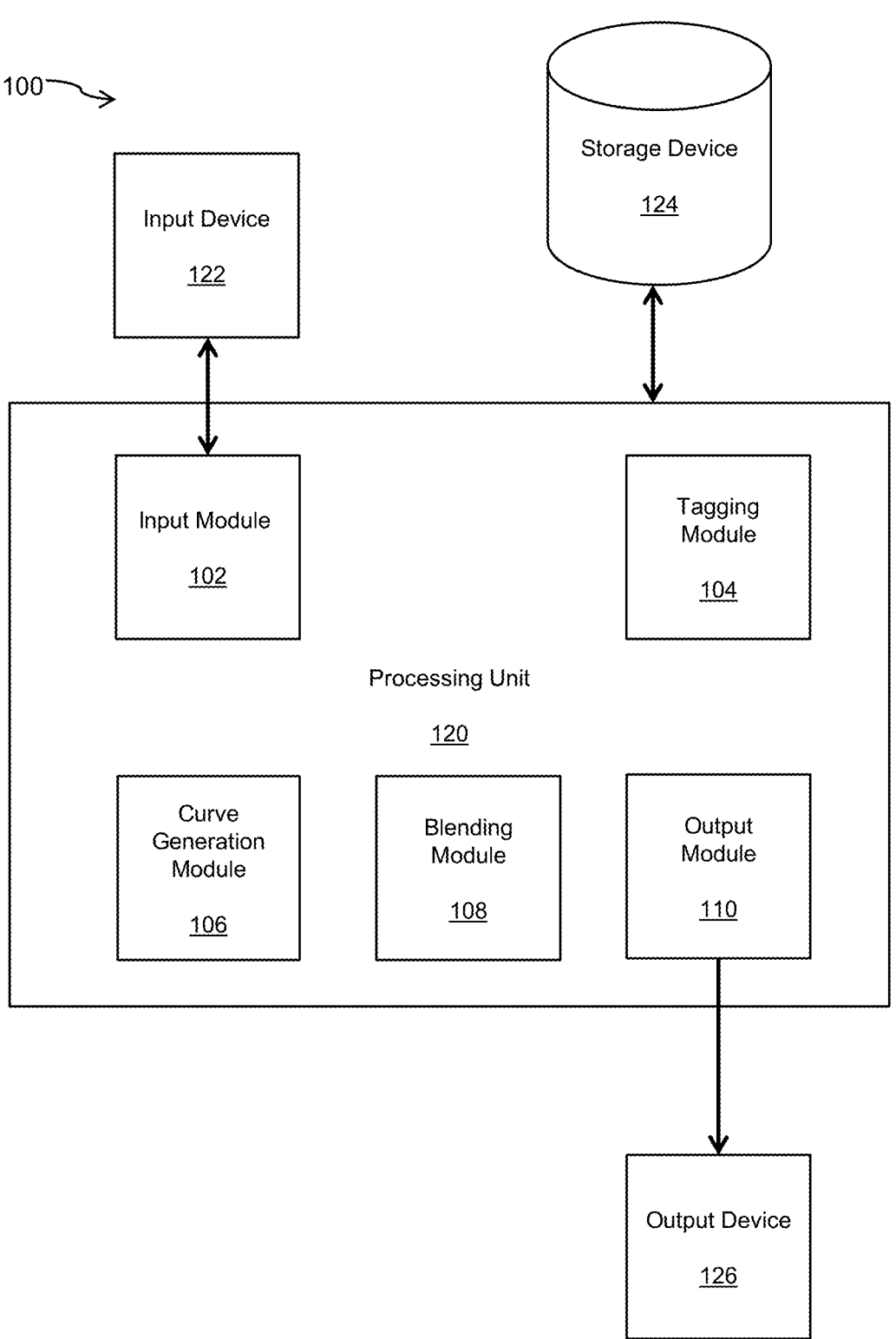
FIG. 1 is a diagram of a system of modulating animation curves.

Embodiments will now be described with reference to the figures. For simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following relates generally to computer animation and more specifically to a system and method of modulating animation curves. Singing and speaking are two fundamental forms of human communication.

Performance-capture approaches for developing speech-related animation can be used to map captured facial motion data of human actors to a digital facial model, yielding natural and high-quality visual speech. Though some early approaches often required the use of physical markers, with advances in stereo and depth cameras, high-fidelity motion capture can be done without markers. This approach has been applied widely. However, a substantial disadvantage of this approach is that the quality of performance depends on the ability of the actor, and the rigidity of captured motion data often removes creative control from an animator who may wish to edit or tune the animation.

Data-driven approaches for developing speech-related animation make use of large motion datasets to generate animation based on input speech audio. Prior to deep learning, most data-driven methods produced animation by performing a search within a corpus of visual speech clips, often minimizing a cost function that traded off similarity between candidate clips and phonemic context and smoothness. Active Appearance models (AAM) and Hidden Markov Models (HMM) can be employed to model speech dynamics and improve effectiveness of search. The advance of deep learning propelled the development of high-quality generative models. By viewing visual speech generation as a sequence-to-sequence mapping problem, neural networks have been used to generate visual speech in both two-dimensional and three-dimensional (3D) media. While these data-driven methods can produce plausible human speech animation, such approaches generally cannot generate compact, animator-centric, animation curves, with meaningful parameters to edit animations in space, time and style.

As used herein, the term "viseme" means 'visible phoneme' and refers to the shape of the mouth at approximately the apex of a given phoneme. Viseme is understood to mean a facial image that can be used to describe a particular sound. Whereby, a viseme is the visual equivalent of a phoneme or unit of sound in spoken language.

Procedural approaches for developing speech-related animation segment speech audio into a series of phonemes, then use look-up-tables, rules, models, or simulation to determine visemes (mouth configurations) for each phoneme; which are then keyframed and interpolated into animation. However, visemes alone do not produce realistic visual speech, as sequences of visemes are often co-articulated by human speakers. Various procedural approaches can be classified by how they model co-articulation. Dominance models determine viseme activation based on dominance functions of adjacent phonemes. Bigram and trigram models use hand-crafted transitions to model short sequences of visemes together at run-time. Rule-based approaches use explicit, often extensible co-articulation rules to determine how adjacent viseme are activated together. Procedural approaches are generally lightweight, explainable, extendable, configurable using deep learning, and generate compact motion curves that animators can easily refine. In this way, the present embodiments use a advantageously modified procedural approach to represent singing animations.

In comparison to visual speech synthesis, visual synthesis of singing has additional substantial challenges. In general, a viseme model that works well for speech vowels will fall short when animating much longer and more expressive singing vowels. The present embodiments advantageously provide an approach that automatically generates expressive face animations from singing audio input. Articulatory phonetics and voice instruction ascribe additional roles to vowels (projecting melody and volume) and consonants (lyrical clarity and rhythmic emphasis) in song. In various embodiments, the present inventors determined that a system can use these insights to define axes for Melodic-accent (Ma) and Pitch-sensitivity (Ps); which together provide an abstract space to visually represent various singing styles.

As described herein, in some cases, vowels can be processed first. A lyrical vowel is often sung tonally as one or more different vowels. Any such vowel modifications can be performed using a neural network trained on input audio. These vowels can then be dilated from their spoken behavior to bleed into each other based on Melodic-accent (Ma); in some cases, with Pitch-sensitivity (Ps) modeling visual vibrato. Consonant animation curves can then be layered in, with viseme intensity modeling rhythmic emphasis (e.g., inverse to Ma). As described herein, the present inventors conducted example experiments to verify and illustrate the substantial advantages of the present embodiments.

Transforming vocal performances into visual performances can be exceedingly challenging because lip-sync timing and mouth shapes (referred to herein as visemes) that are typically used for speech visualization are usually ill-suited to singing; particularly when the performance moves from spoken lyrics to dramatic singing styles. An example reason for this failing is that all phonemes play largely the same role in speech audio because phonemes all contribute to the listener's comprehension of the language spoken. Fundamentally, in addition to any lyrical content, singing must communicate melody and rhythm. Bio-acoustically, the sustained open-mouthed sound of vowels are much better suited than consonants to carry the volume and pitch variation of a melody. Generally, sung vowels are also often modified aggiustamento for tonal quality or sustained resonance and the craft of voice instruction explicitly teaches the principal importance of vowels in singing.

The role of consonants in singing is generally to preserve lyrical comprehension and to punctuate the melody by emphasizing beat and rhythm. In some cases, singing can span a stylistic spectrum from spoken lyric (for example, sprechgesang and rap), to legato (for example, bel canto), to vocalese, and to consonant-free drones (for example, Indian classical raga). Embodiments of the present invention represent this dominance of vowels in accentuating melody to more accurately portray singing in animations by using a dynamically varying Ma (Melodic-accent) parameter $\in[0,$ 1]. This parameter captures the continuum from regular speech (Ma=0) to a consonant-free transition of vowels into each other (Ma=1).

The communicative efficiency of speech lends generally to having viseme animation curves that are monotonically represented using an attack, sustain and decay behavior. Beyond melodic pitch variations of sustained vowels, singing is often enriched with musical ornaments, for example vibrato and trills, which introduce small periodic variations of pitch around notes. Such ornaments, although often appearing as minute, transient facial motions, can be important perceptually in co-relating the vocal and visual performance. Embodiments of the present invention represent this aspect of singing using a Ps (Pitch-sensitivity) parameter $\in[0,1]$. This parameter can vary from monotonic rise and fall in intensity of vowels in regular speech to quivering vowel mouth animation of a strong and deep vibrato. Together with Jaw and Lip parameters, Ma-Ps-Ja-Li four-dimensional (4D) space is provided in the present embodiments that advantageously encompass a wide range of stylistic spoken and sung behaviors.

The present inventors have determined that credible visual depiction of singing requires considering both the physiology of phonation, and style of performance. Physiologically, the present embodiments introduce vowel modification and larynx movements to reflect timbre and pitch changes. The present embodiments make use of Jaw (Ja) and Lip (Li) parameterization with an additional Ma-Ps field. The Ma-Ps field introduces two independent axes that embed various additional layering, and provide animators with stylistically meaningful control. In some embodiments of the present disclosure, layering of Ma modulated consonants over the vowel dominant animation curves can be used. In this way, the present embodiments can decouple and layer spatio-temporal contribution of vowels and consonants with Ma and Ps parameters, to better handle the complex co-articulations and vibrato of singing.

Turning to FIG. 1, a diagram of a system 100 of modulating animation curves, in accordance with an embodiment, is shown. The system 100 includes a processing unit 120, a storage device 124, an input device 122, and an output device 126. The processing unit 120 includes various interconnected elements and conceptual modules, including an input module 102, a tagging module 104, a curve generation module 106, a blending module 108, and an output module 110. The processing unit 120 may be communicatively linked to the storage device 124 which may be loaded with data, for example, input data, phoneme data, animation data, or the like. In further embodiments, the above modules may be executed on two or more processors, may be executed on the input device 122 or output device 126, or may be combined in various combinations.

While the present disclosure is generally directed to layering consonant and vowels for the application of animating singing, the present embodiments can also be used in other types of non-verbal animation sounds (i.e., where there is no language content); such as breathing, yawning, laughing, yodeling, sneezing, and the like. In this way, consonants (or other lip based sound shaping) can be layered onto and in-between such sounds to add lyrical and/or verbal clarity or emphasis at certain points of time.

The acoustic quality of a voice is affected by the configuration of the larynx and upper vocal tract. The larynx affects the vibration frequency of the vocal folds, perceived as pitch. The jaw, tongue, pharynx (throat), and lips affects sound resonance, perceived as timbre. Animated realism declines if these visible physiological structures remain static during changes in voice acoustics. The system 100 makes use of larynx movement and vowel modification to reflect pitch and timbre change, respectively.

For some animation models, the larynx is an internal structure that is visible only as a protrusion that moves up and down (superior-anterior) on the neck. Raising the larynx decreases the length of the upper vocal tract, increasing the frequency of formants and perceived vocal brightness. However, in practice, singers often use the larynx to sing at a higher melodic pitch. With this in mind, the system 100 raises the larynx when vowels are phonated, with the amplitude of movement determined by pitch.

When phonating vowels, singers often adjust the timbre of vowels for melody, resonance or artistic effect, known as "aggiustamento" or vowel modification. For example, Whitney Houston sings an iconic "I" from the chorus of "I will always love you" as a triphthong: she starts singing the "I" with /ai/, transitions to /i/ then back to /a/. Since resonance is largely determined by mouth shape, if the vowel modification were not reflected by the lip-sync, the animation would lose realism. The system 100 advantageously uses vowel modification based on, in most cases, five pure Italian vowels (A, E, I, O, and U); commonly used in vocal exercises. Each vowel has a distinct timbre and can only be produced by certain jaw and lip configurations. In most cases, the system 100 can use a neural network to identify these vowels from the audio signal and modify the lyrical vowel with the one or more vowels that are sung.

Figure 3A:
FIG. 3A illustrates an example of input audio and lyrics.
Figure 3B:
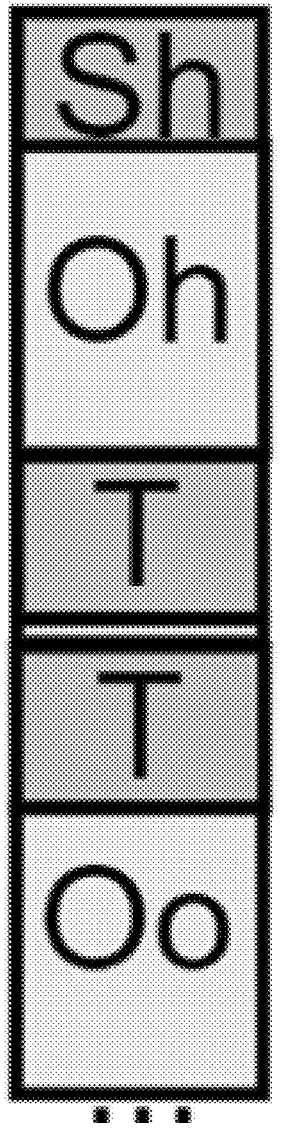
FIG. 3B shows an example of phonetic alignment after processing of the input of FIG. 3A.
Figure 3C:
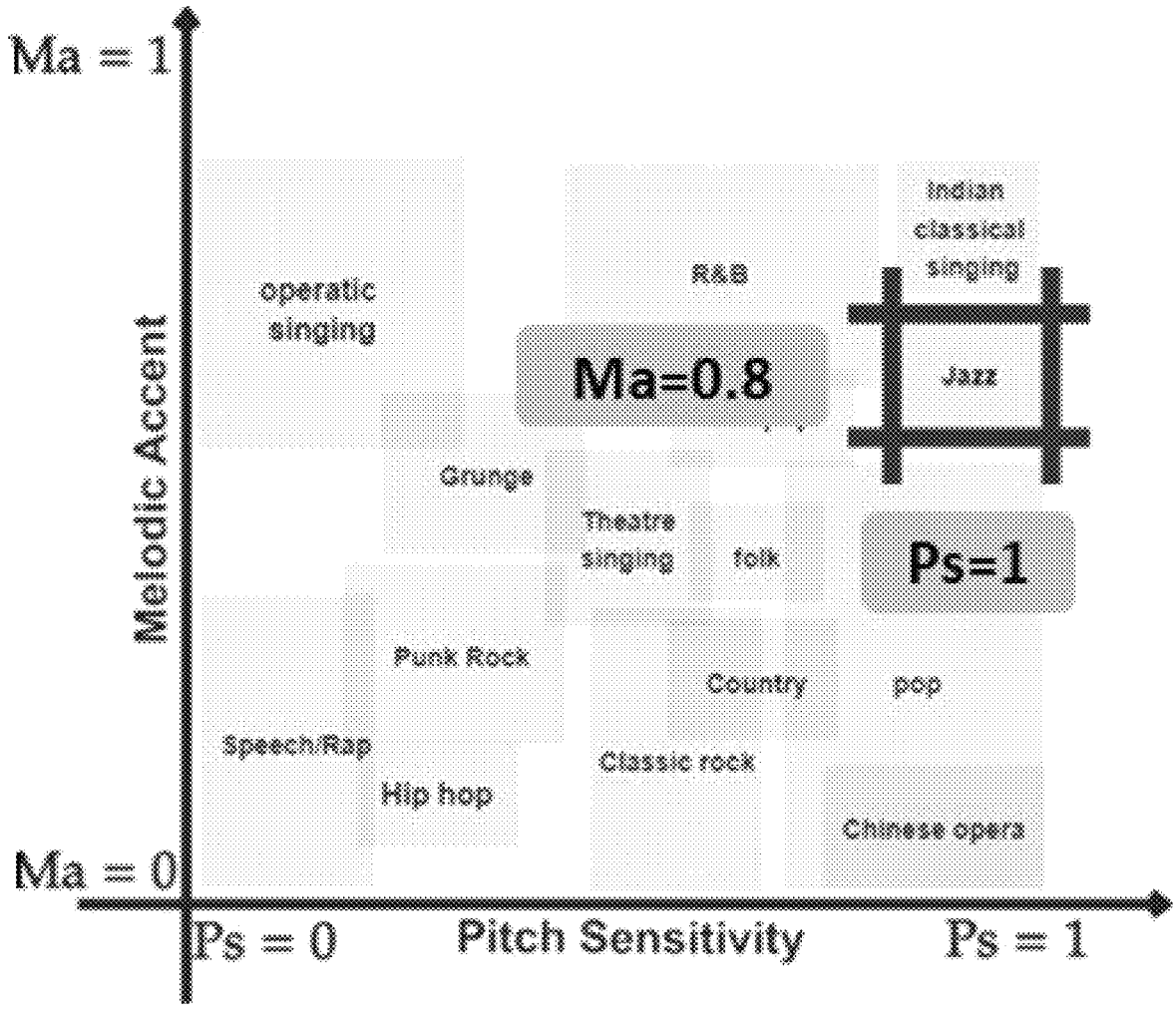
FIG. 3C is a graph illustrating an example of Ma-Ps parameters to capture various singing styles.
Figure 3D:
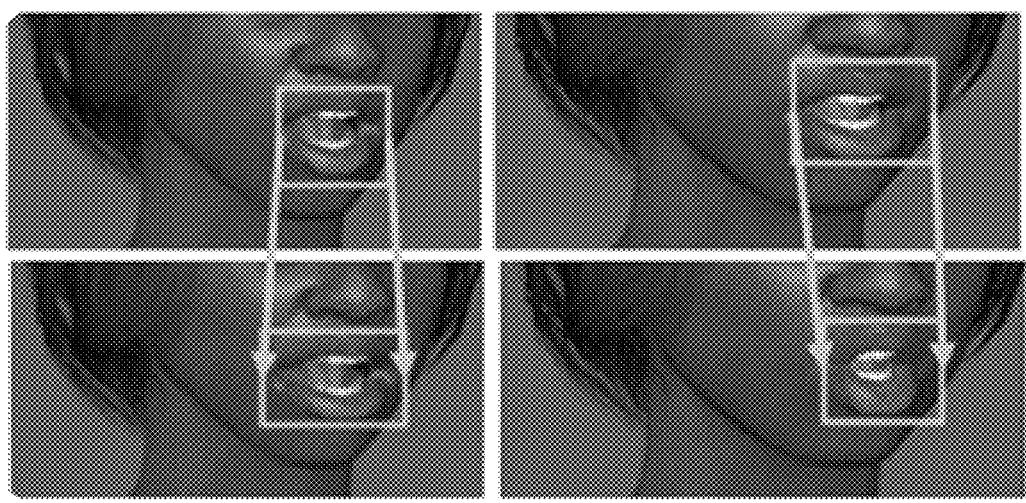
FIG. 3D shows an example animation after detecting and modifying vowels that are sung differently to their transcription.
Figure 3E:
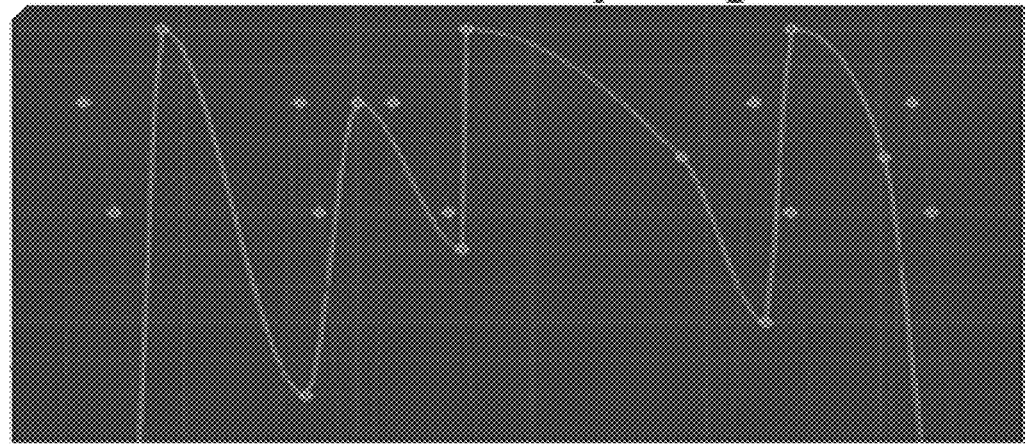
FIG. 3E shows example vowel animation curves to carry the melody, layered with consonant curves for lyrical clarity and rhythmic emphasis.
Figure 3F:
FIG. 3F illustrates an example of lower face animation with the layering of FIG. 3E applied.

FIGS. 3A to 3F illustrate an example implementation of the system 100. FIG. 3A illustrates an example of input audio and lyrics and FIG. 3B shows an example of phonetic alignment after processing of such input. FIG. 3C illustrates a rough example graph of Ma-Ps parameters to capture various singing styles. FIG. 3D shows example animation after detecting and modifying vowels that are sung differently to their transcription. FIG. 3E shows example vowel animation curves to carry the melody, layered with consonant curves for lyrical clarity and rhythmic emphasis. FIG. 3F illustrates an example of lower face animation with the layering applied.

Figure 4:
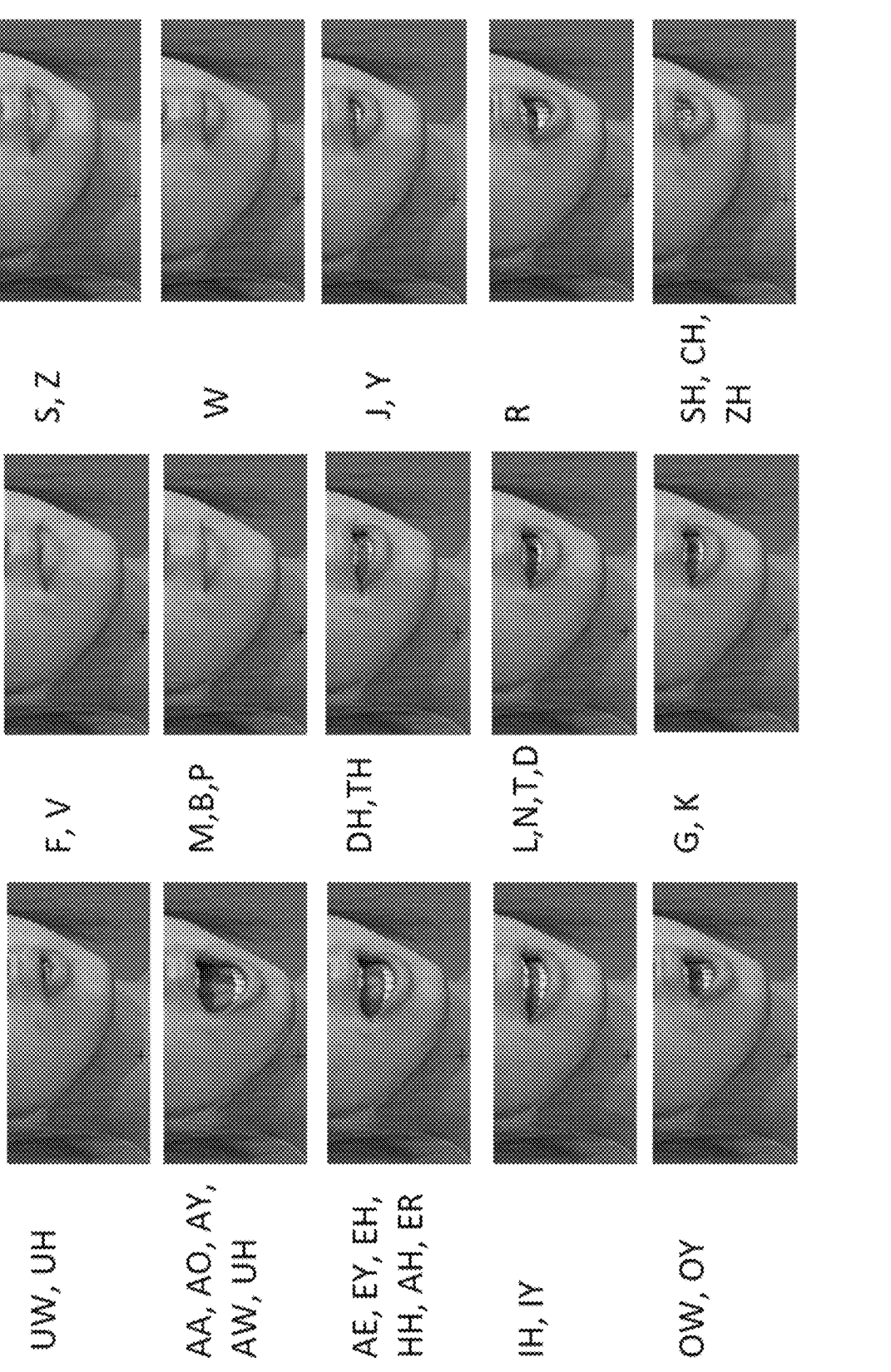
FIG. 4 is a table illustrating example phonemes (Carnegie Mellon University Pronouncing Dictionary notation) to visemes.

FIG. 4 illustrates a table mapping example phonemes (Carnegie Mellon University (CMU) Pronouncing Dictionary notation) to visemes used in accordance with the present embodiments.

Various other frameworks for procedural lip-sync animation are based on mapping phonemes to visemes. For example, the phoneme /æ/ would be mapped to the viseme /Eh/, which looks like opened jaw with stretched lips (see FIG. 4 for a full list of mappings). With a suite of hand-crafted blendshapes that resemble the visemes, animations can be created by key-framing and interpolating between the blendshapes over time. However, these approaches cannot adequately account for the various styles of phonation present in singing, where sung vowels and consonants play different roles; for example, consonants emphasize rhythm and vowels carry the melody. The present inventors discovered that a considerable proportion of singing-style variation can be mapped to a spectrum of different contribution of vowels and consonants. For example, rap songs that are rhythm-heavy would have clearly articulated consonants and speech-like vowels, while operatic bel-canto and Indian classical singers barely articulate consonants, focusing on melodic vowel transitions. The system 100 models the spectrum of singing styles using at least Melodic accent (Ma), and Pitch sensitivity (Ps). A rough example illustration of Ma-Ps for various singing styles is shown in FIG. 3C.

Melodic accent (Ma) denotes the importance of melody relative to the phonetic parity of spoken lyrics, and the continuum between separately sung notes (staccato) and notes tied together (legato). Since vowels predominantly convey melody in song, increasing melodic accent shifts a visual performance from speech-like to a visual performance with diminished consonants and greater co-articulation between adjacent vowel visemes; where the mouth remains somewhat open in continuous phonation.

For pitch sensitivity (Ps), sung vowels can be phonated as either syllabic or melismatic. In syllabic singing (also known as speech singing), each vowel carries only one note, while in melismatic singing, rapid or considerable pitch changes can occur during the phonation of the same vowel. Though pitch change is largely an internal process, it may manifest externally in different ways. Amateur and pop singers habitually open their jaws wider to reach higher notes, and tremble their jaws to sing a vibrato. On the other hand, trained opera singers can perform pitch change and vibrato with minimal mouth movement. The system 100 parameterizes this range using the notion of pitch sensitivity (Ps).

In speech, the ratio of vowel-to-consonant duration is roughly 5:1. For singing, this ratio can rise to, for example, 200:1. This can be attributed to the biomechanics of consonant phonation. While vowels are produced by vocal cord vibration actuated by constant airflow, consonants are produced by narrowing parts of the upper vocal tract and disrupting the airflow. To establish a more stable melody, singers may sacrifice the intelligibility of consonants. This layering of consonants over vowels in song closely parallels the instruction methodology of many vocal coaches.

Rather than treating vowels and consonants as being in the same class of visemes, the system 100 considers vowel visemes as having both jaw and lip contributions, while most consonants only contribute to lip motion, with the exception of sibilants and labial dental consonants. In this way, since consonants occur at the boundary of vowels, the corresponding jaw movement can be completely determined by the co-articulation of vowels. As a result, the Ma parameter also determines the apparent degree of consonant contribution. At a low value of Ma, consonants at a boundary would have a higher contribution, as they temporally overlap with narrowing the jaw between vowel visemes. Conversely, a high value for Ma would reduce the perceived contribution of the consonant.

In most cases, the system 100 can parametrize visemes jaw (Ja) and lip (Li) parameters, which can be used to control viseme enunciation. For vowel modification, action units can be used for lip-rounding and lip-stretching. In this way, Ja-Li parameters manipulate the spatial appearance of visemes (tongue-jaw configurations and lip shape) and Ma-Ps modulate the temporal behavior of the visemes (the extent and shape of the viseme animation curves). While Ja-Li parameters typically suffice for speech, Ma-Ps provide substantial advantages in representing the different roles of vowels and consonants, and temporal dynamics, in, for example, singing. In some cases, the system 100 can allow an animator, via the input device 122, to independently control the Ja-Li-Ma-Ps parameters to edit singing style; with Ma=0 and Ps=0 producing speech (non-singing) animation.

In an example, to create the animation of a smooth jazz singer, an animator could reduce the Ja-Li parameter to lower the perceived effort of the singer, by lowering the activation of the jaw and face muscles in enunciating phonemes. Additionally, the animator could increase Ma-Ps parameter to visually highlight the improvised pitch and tone change. To create a more operatic style, the animator could increase the Ja parameter to emphasize projected volume, and increase the Ma parameter to emphasize melodic vowels, while, optionally, lowering the Li and Ps parameters to lower lip dynamics in order to showcase an animated singer's control.

Figure 2:
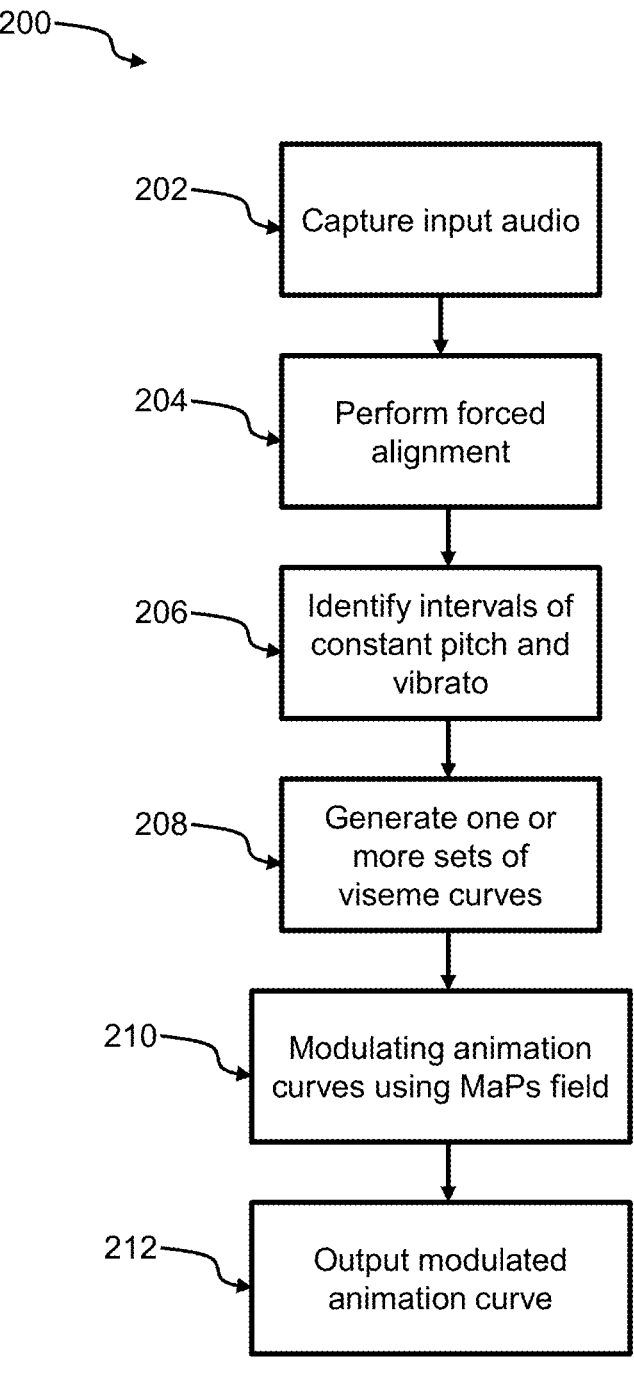
FIG. 2 is a flowchart of a method of modulating animation curves.

Turning to FIG. 2, a flowchart for a method of modulating animation curves 200 is shown. In some cases, at block 202, captured audio is received by the input module 202 from the input device 122 or the storage device 124. In certain cases, the captured audio can also include associated textual transcript/lyrics. In other cases, the associated textual transcript/lyrics can be generated by the input module 102 using any suitable audio to text methodology.

The system 100 can create lip-sync animation from audio in a two-phase approach: tagging in a first phase and animation curve generation is a second phase. In the first phase, at block 204, the tagging module 104 performs forced alignment to temporally align phonemes to audio. At block 206, the tagging module 104 tags the audio to identify intervals of constant pitch and vibrato. In the second phase, at block 208, the curve generation module 106 uses the phoneme timing to generate one or more sets of viseme curves with different singing styles; in an example, a set of four curves. The curve generation module 106 also generates animation curves for vowel modification and larynx movements. At block 210, the blending module 108 modulates the animation curves using the Ma parameter, using the Ps parameter, or using a combination of the Ma and PS parameters. At block 212, the output module 110 outputs the modulated animation curves to the output device 126, or the storage device 124, for visualization using the modulated animation curves.

In some cases, the tagging module 104 can use acapella or roughly acapella audio as input, for example, as can be obtained using vocal isolation tools. The tagging module 104 tags the audio to generate timings for phonemes present in the song. This tagging can be accomplished using forced alignment; for example, using a trained language model that maps input audio and a phonetic transcript, to phoneme timings. Phonetic transcripts can be generated from song lyrics using a pronunciation dictionary (for example, the CMU pronunciation dictionary).

In some cases, the tagging module 104 can also detect other acoustic events apart from phonemes, including intervals of vibrato and constant pitch. To detect these events, the tagging module 104 can make use of pitch estimation $f_0(t)$. To prevent the high frequency consonants from skewing the pitch estimate, in some cases, this determination can be performed only during the phonation of vowels.

In many instances of proper singing technique, the periodic pitch variations of a vibrato need not be visibly manifest on the face. However, in accordance with the principle of exaggeration for animation, the system 100 can include some physical movement in the jaw and neck to avoid the character looking static when holding a long vibrato. To detect vibrato, the tagging module 104 finds intervals with periodic oscillation in the pitch signal $f_0(t)$. Finite differences are used to compute $f_0'(t)$ from which a list of zero-crossing points representing peaks in $f_0(t)$ can be obtained. The tagging module 104 then iterates over the zero-crossing points to determine intervals at which the points are a similar distance apart. In an example, to filter out noise, the following constraints can be used:

The vibrato interval must have more than one period.

The standard deviation must be less than 1 semi-tone.

The vibrato period $\in [\frac{1}{5}, \frac{1}{8}]$ seconds.

To model melismatic singing, for each vowel phoneme, the tagging module 104 can also consider the pitch signal $f_0(t)$, where $t \in [t_0, t_N]$. Since raw pitch is generally too noisy to be used directly, a series of linear segments can be fit to approximate the pitch signal. The relatively flat segments can be considered as notes, and steeper segments considered as note transitions. The tagging module 104 performs piece-wise-linear fitting for an interval of $f_0(t)$ with N points, using a dynamic approach to jointly minimize the number of linear segments and overall fitting error. A matrix $M \in \Re^{N \times N}$ (N=#pitch samples at, for example, 100 frames-per-second (fps) in a vowel) is generated as follows:

$$M(a, b) = \min_{a < x < b} \{M(a, k) + M(k, b), E_{fit}(a, b) + E_{cost}\}.$$

M(a, b) denotes the minimal cost of connecting a to b using a series of linear segments. Since a<b, M is strictly upper triangular, $E_{cost}$ is a constant penalty of adding additional line segments, which are empirically set as $$E_{cost} = \frac{(f_{min} + f_{max})}{2},$$

where $f_{min}, f_{max}$ are minimum and maximum pitch within the interval. $E_{fit}(\cdot, \cdot)$ denotes the fitting error, which can be computed as follows:

$$E_{fit}(a, b) = \sum_{t=a}^{b} |f_0(t) - (slope_t \times t + yint_t)|,$$

where $slope_t$ and $yint_t$ are slope and y-intercept of the $t^{th}$ interval, respectively. A bottom-up computation, yields a series of connected linear segments approximating the pitch signal, denoted as $f_{lin}(t)$. The segments in $f_{lin}(t)$ with a slope less than a threshold (for example, set as 50 Hz) can be considered as constant notes.

After obtaining the transcript with phonetic and acoustic features, the curve generation module 106 generates curves to drive the visemes and other facial action coding system (FACS) action units. In some cases, the curve generation module 106 can generate the viseme curves and larynx motion curves first, as the timing for vibrato and vowel modification are generally contingent on the timing of the viseme activation.

Figure 5:
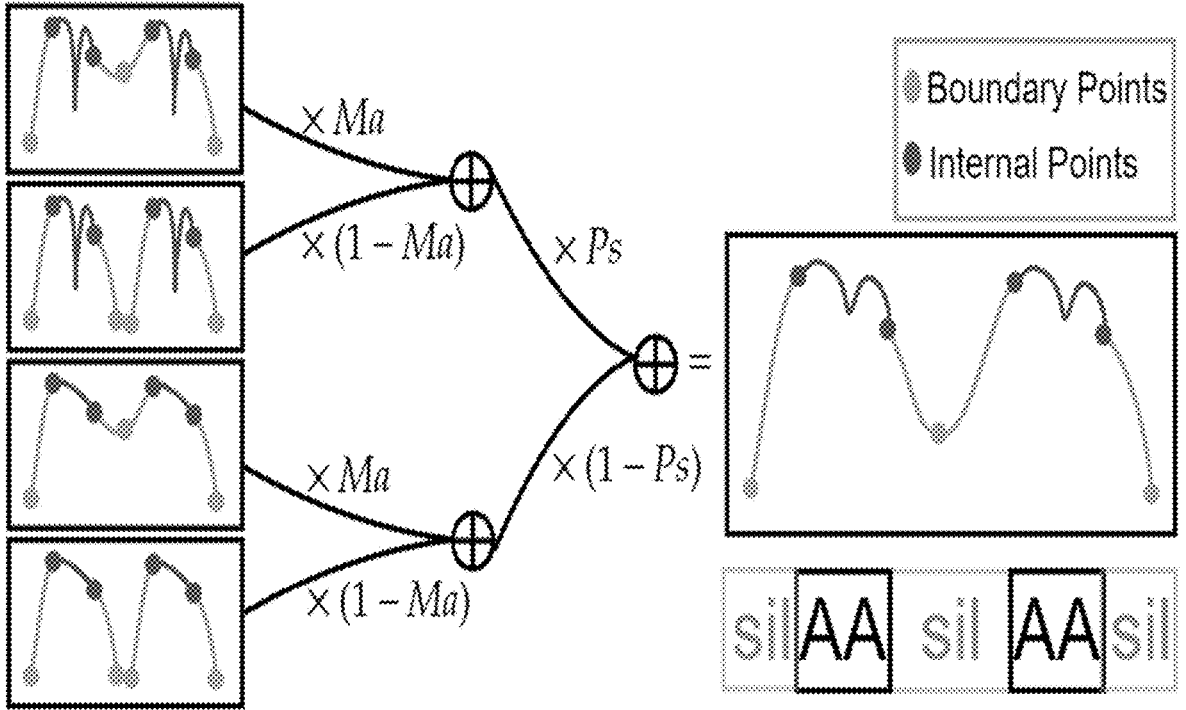
FIG. 5 illustrates examples of viseme animation curves as a combination of four curves based on Ma-Ps values.

FIG. 5 illustrates examples of viseme animation curves as a combination of four curves based Ma-Ps values.

Sparse keyframes can be used, in a particular case, to sequentially activate visemes based on phonemic timing, acoustic information, and co-articulation rules. The profile of each viseme is specified by two types of keyframes: boundary keys and internal keys. The boundary keys demarcate lip movement before and after the phonation of the viseme, and internal keys control the lip movement during phonation, as illustrated in FIG. 5. Ma and Ps values further control boundary and internal keyframes, as also shown in FIG. 5. In this example, viseme animation curves are a bilinear interpolation of four viseme curves generated with extreme values {0,1} for Ma and Ps. Note that no melodic accent and no pitch sensitivity (Ma=Ps=0), produces only jaw and lip contributed speech animation. The Ma and Ps extremes can be referred to as speech curves and singing curves, respectively.

In some cases, the speech curve can be generated by the curve generation module 106 in three passes. The first pass generates a four-key viseme curve for each phoneme, the second pass enforces vowel-consonant co-articulation rules, and the third pass corrects conflicting keyframes.

In the first pass, for each phoneme in the transcript, the viseme is selected as per, for example, the table in FIG. 4. The boundary frames for each viseme are timed, for example, 120 ms before and after the phonation interval to reflect general speech physiology. The internal frames are selected to reflect how the viseme would apex at the beginning at phonation and sustained until, for example, 75% of the sound is completed. The amplitude for the frame at the apex can be selected depending on the length and visemes types. In an example:

Jaw and Lip closer consonants (B, P, M, F, V, S, SH) are fully articulated ($\alpha$=1).

Other consonants and short vowels (duration<200 ms) are articulated less prominently ($\alpha$=0.6).

Longer vowels (duration>200 ms) are more articulated ($\alpha$=0.8).

Generally, activating visemes in sequence is robotic and unrealistic. In the second pass, it is generally beneficial to consider co-articulation between neighboring phonemes. An example of vowel-consonant co-articulation rules as provided herein.

Figure 6:
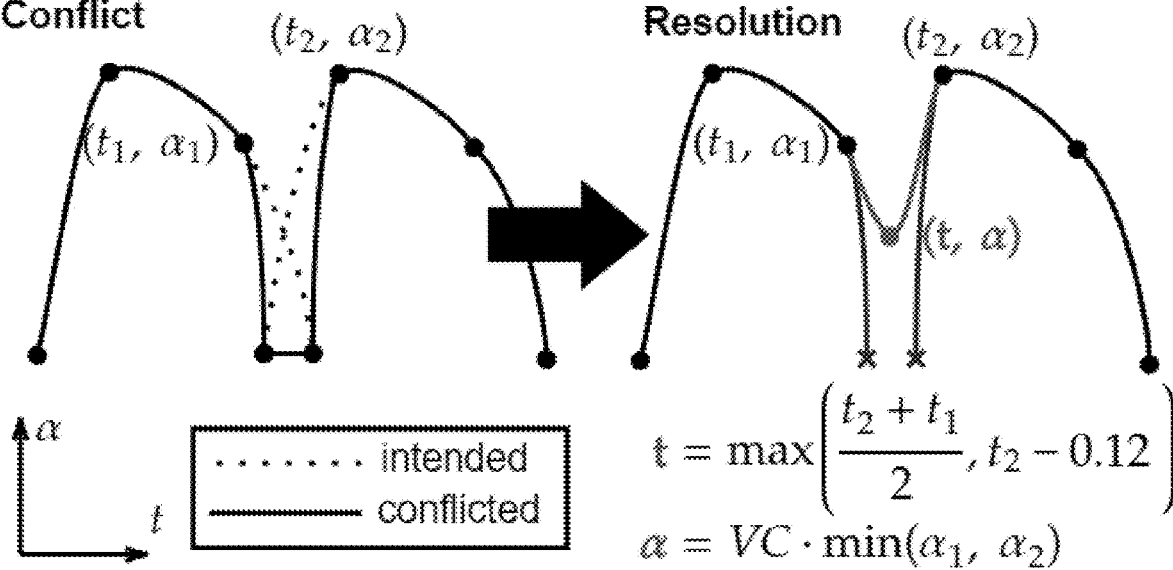
FIG. 6 illustrates an example of co-articulated, repeating visemes overlap (left-side) and resolving conflicting keyframes by combining viseme curves (right-side)

For the third pass, co-articulated, repeating vowels can minimally overlap at phonation boundaries, resulting in keyframes that are undesirably interpolated, see the left-side of FIG. 6. This conflict can be resolved by combining (co-articulating) two visemes by replacing the overlapping keyframes by a single keyframe. This single keyframe can be inserted, for example, 120 ms ahead of second viseme onset (where possible), and otherwise, mid-way between the two visemes. This insertion is exemplified on the right-side of FIG. 6. The amplitude of the new keyframe is chosen to reflect both the decay of the first viseme and the onset of the second viseme, in some cases, controlled by a user-defined vowel co-articulation (VC) parameter (a default can be, for example, VC=0.5 for speech curves).

In some cases, the singing curve can be generated by the curve generation module 106 in three passes. The first of the three passes generates viseme curves with additional internal keys defined for different notes. The second pass enforces consonant co-articulation, and subsequently, modifies vowel boundary keys to reflect vowel-vowel co-articulation. The final pass resolves conflicting keyframes.

In the first pass, for singing, consonant and vowel motion curves can be generated separately. For each consonant, the four-key speech curve can be used, as described above. For vowels, the curve generation module 106 can utilize the notes detected from audio tagging. If a vowel is syllabic (containing only one note), the viseme would generally apex when the note is reached, and decay as a speech vowel. For a melismatic vowel (containing multiple notes), the present inventors determined that the viseme would often apex multiple times during phonation, with the apex coinciding with the start of each note and mildly decaying as the note finishes.

To reflect the above characteristics, internal keyframes can be set at the start and end of each note, where the amplitude of the starting key depends on the pitch of the note, for example: $\alpha_s$=0.4$\times$($f_0(t_{start})$−$f_{0,min}$)/($f_{0,max}$−$f_{0,min}$)+ 0.6 and the amplitude of the end keyframe decays from the starting frame, for example, $\alpha_e$=0.95$\alpha_s$. In some cases, to emphasize the transition between each note, an internal keyframe can be set between each note at time, for example, t=0.5*($t_{end}^{prev}$+$t_{start}^{next}$), with amplitude, for example, $\alpha$=0.9*min($\alpha_{end}^{prev}$,$\alpha_{start}^{next}$). Vibrato can be animated over the detected interval by setting keys to oscillate the given Ja setting at, for example, 7 Hz, with increasing amplitude up to, for example, ±0.6, to reflect an average vibrato.

Similar to the speech curve, the second pass enforces co-articulation. The curve generation module 106 can use jaw and lip rules, as described herein, to ensure vowel-consonant co-articulation. In some cases, to model a strong melodic accent for vowels, the curve generation module 106 makes closely spaced vowel visemes (for example, phonation intervals<300 ms apart) blend into each other by extending the boundary keys of both visemes. In most cases, consonants between such vowel visemes would have little visual contribution.

Vowel-vowel and vowel-consonant co-articulation can introduce conflicting keyframes in the viseme and larynx motion curves. These are resolved, in the third pass, as escribed herein with, for example, a VC=0.95 to reflect greater melodic accent.

Given the speech curve (Ma=0, Ps=0) and the singing curve (Ma=1, Ps=1), the boundary keyframes from the speech curve and internal keyframes from the singing curve can be used to generate (Ma=0, Ps=1). Similarly, the internal keyframes from the speech curve and boundary keyframes from the singing curve can be used to generate (Ma=1, Ps=0). An example of the four combinations of curves can be seen in of FIG. 5.

Psycho-acoustic heuristics, as described below, can be used to determine Ma and Ps from input audio. However, in other cases, Ma-Ps values can be received from a user controlled for song-style, or can be learned from a corpus of captured songs.

Strongly articulated fricative (S/Z/F/V/S/Sh/D/T) or plosive (P/B/D/T/G/K) consonants generally produce turbulent airflow with localized high frequency energy (for example, HF=8-20 kHz). In some cases, the blending module 108 can use the consonant's spectral high-frequency (HF) energy, $\epsilon$, relative to the HF energy of consonants for an extended period (for example, an entire song) to determine Ma. Where Ma=0.2 if $\epsilon$≤mean−stdev, Ma=0.8 if $\epsilon$≥mean+stdev, else Ma=0.5.

Pitch variation is common, during sustained vowels, in which case static lips can seem unnatural. The blending module 108 can use the duration of a vowel v, relative to the average length of a spoken vowel (for example, $\tau$=0.2 s) to determine Ps. In an example, Ps=0.1 for v≤$\tau$, else Ps=min (1,0.1+v−$\tau$).

While singing style can vary as frequently as every phoneme, the blending module 108, in some cases, can use neighboring averaging to produce a smoother Ma-Ps signal.

In some cases, the blending module 108 can detect timbre changes using a neural network in order to make viseme modifications for differently transcribed and sung vowels. The neural network maps an input audio feature vector to a probability distribution for each of the five Italian vowels (and silence) at each timestamp. In an example implementation, the neural network architecture can consist of three long short-term memory (LSTM) layers, a ReLu activation layer, a single fully connected layer, and a softmax function to produce prediction probabilities.

In an example, the audio feature vector can be constructed consisting of thirteen Mel Frequency Cepstral Coefficients (MFCCs), twenty-six raw Mel Filter Banks (MFB), and twenty-six Spectral Subband Centroid features (for example, extracted every 10 ms with window size 25 ms). The network's receptive field can be increased using concatenate-captured iog sme with 12 prabsequent frames.

Figure 7:
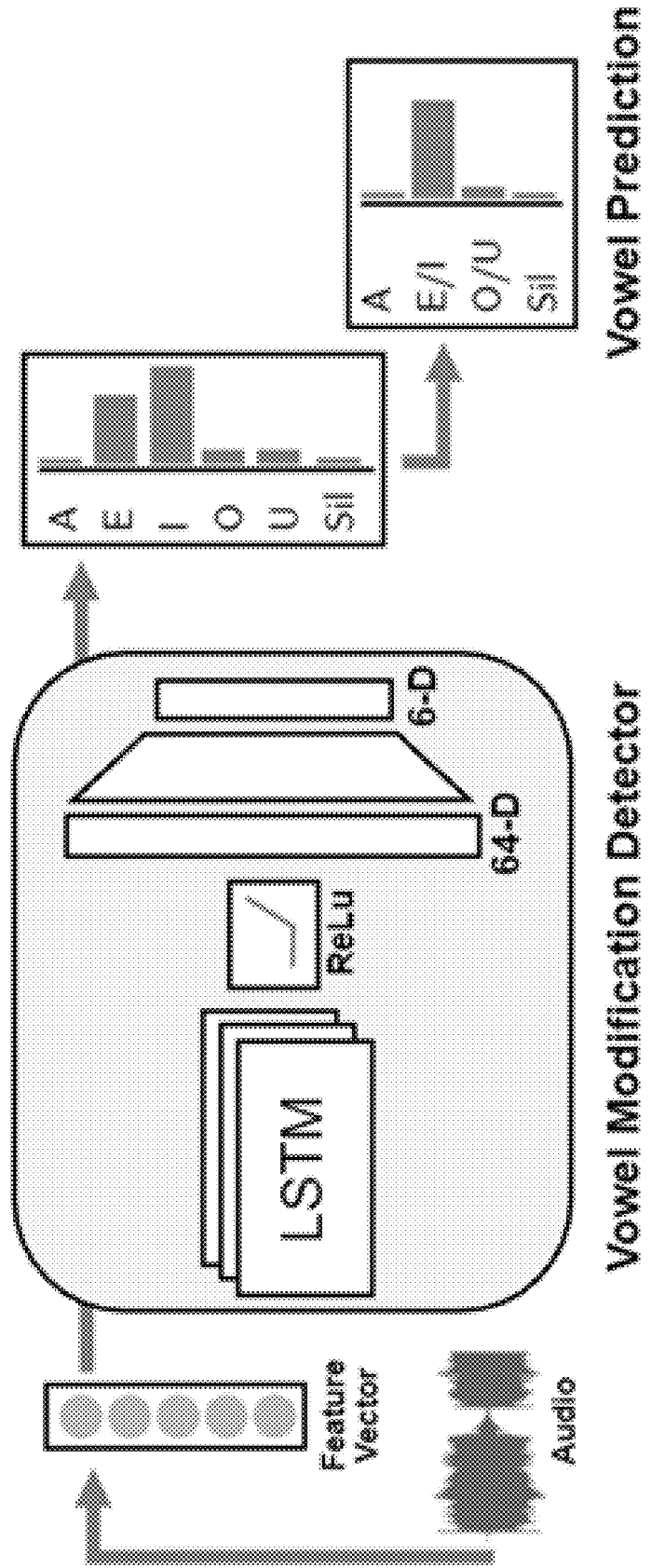
FIG. 7 is a diagram illustrating an example of a neural network for vowel modification to predict vowel probabilities from input audio.

FIG. 7 is a diagram illustrating an example of the neural network for vowel modification to predict vowel probabilities from input audio. In an example experiment, the network was trained on a VocalSet corpus comprising 10.1 hours of singing performed by 20 professional singers in a variety of styles for each of the five Italian vowels. Each audio file was labeled by the vowel and singing style used for that clip. For training, the audio tracks were split into 4-second clips, with each timestamp labeled by either the corresponding vowel of that clip or silence. The clips of 4 of the singers were reserved as a test set.

In the example experiment, the network was trained to minimize cross-entropy loss at each timestamp with an Adam optimizer; with an initial learning rate of 0.0001 and a batch size of 512. Since the training data did not include transitions between vowels, it was augmented by concatenating multiple clips. The model achieved a test accuracy of 70%. The error arises from confusion between lip-spreaders "E", "I" and between lip-rounders "O", "U". For this reason, easily confused vowel predictions were merged, as shown in FIG. 7, to achieve a test accuracy of 91%.

For each vowel, the neural network can be used to detect the likely sung vowel(s) from the audio. In some cases, to avoid excessive modification, only vowels with, for example, a prediction probability>60% threshold were modified. For example, lipSpread and lipRound Action Units can be modulated (+/−) to modify these vowels as follows:

| Transcript Vowel | Neural Network Predicted Vowel | | |
| --- | --- | --- | --- |
| | A | E or I | O or U |
| A | Nothing | +lipSpread | +lipRound |
| E or I | −lipSpread | Nothing | −lipSpread +lipRound |
| O or U | −lipRound | −lipRound +lipSpread | Nothing |

The blending module 108 can generate four-key motion curves to modulate the desired (+/−) expression change. The apex amplitude can be based on the prediction probability and the maximum amplitude of the action unit ($\alpha$=P(prediction)·$\alpha_{max}$). The action unit motion curves can be co-articulated, and start and/or end just before the transcribed vowel.

Figure 8:
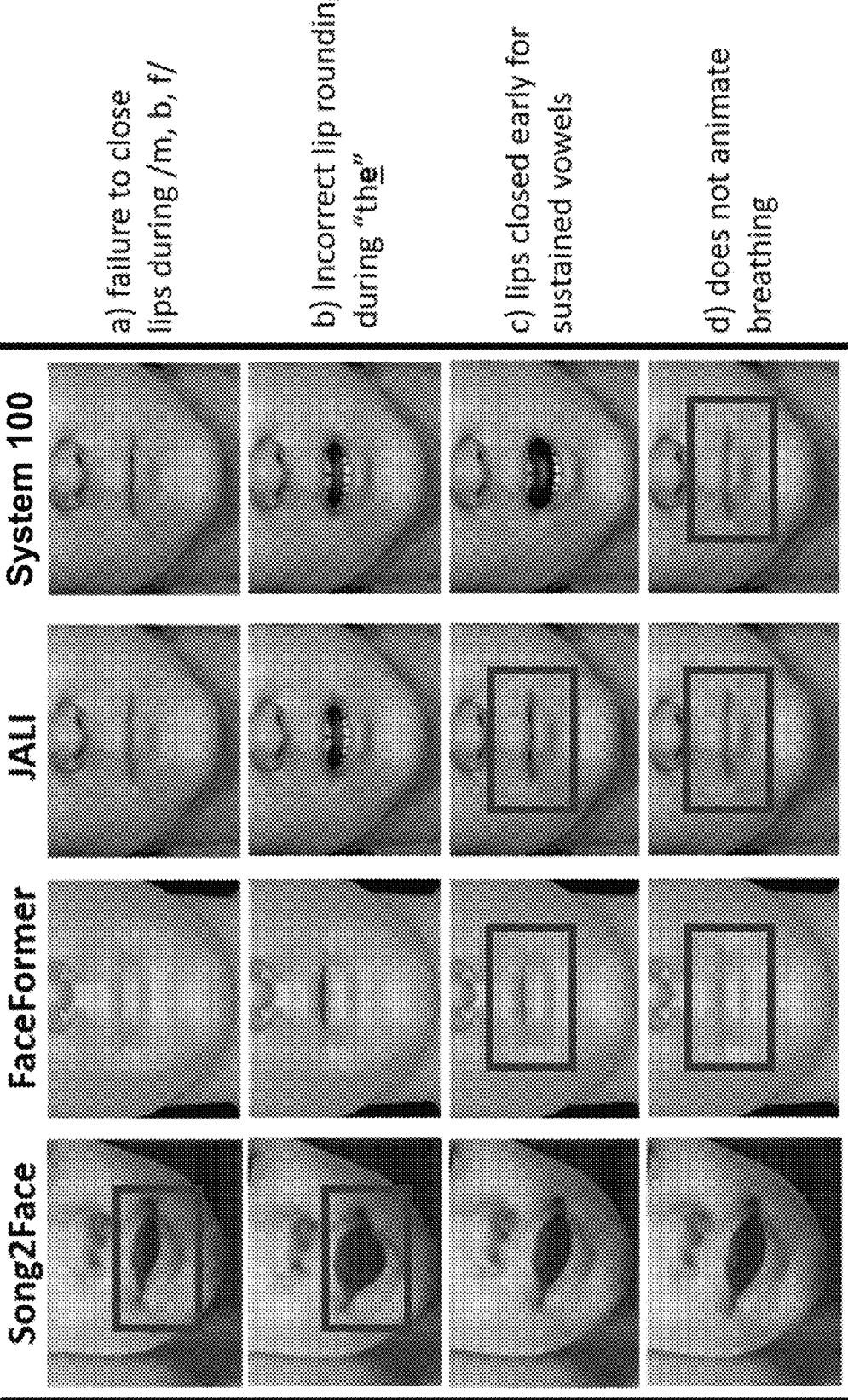
FIG. 8 is a chart summarizing a comparison of failure cases of the system of FIG. 1 to song2face, FaceFormer, Jaw-Lip (Ja-Li) models.

In other example experiments, audio of the song "Hey Jude" was used to generate singing animation using the system 100. FIG. 8 summarizes a comparison of the system 100 to song2face, FaceFormer, Jaw-Lip (Ja-Li) models. Song2face is consistently unable to produce plausible animation, a common weakness of purely deep-learning approaches that lack understanding of acoustics and human anatomy. Speech models Faceformer and Ja-Li enunciate consonants well, but fail to animate vowels effectively. Shorter vowels tend to over-articulate, robotically opening/ closing the jaw completely for each vowel. Sustained vowels seem inexpressively monotonic, failing to show pitch change and vibrato.

Physiologically, the mapping between sound production and facial appearance is not unique, especially when singing vowels (for example, it is easy to sustain an "Ee" vowel while changing expression). Thus, quantitative error of an animated face relative to a ground truth vocal performance, alone, can be misleading. The example experiments showed that the system 100 has a lower cumulative error in both vertex position and velocity than a pure Ja-Li model alone.

With the example experiments, the present inventors ran a 31 lay-person, forced choice preference study between an animated output of the Ja-Li model and the animated output of the system 100. Presented randomly, for 10 clips, viewers strongly preferred the output of the system 100 (>70% votes) for 6/10 clips. The remaining 4 clips were speech-like (low Ma-Ps values), visually very similar, and received a mixed preference (¾ in favour of the system 100).

In summary, the present embodiments provide an advantageous approach to visual-singing animation that can model different singing styles by modifying the contribution of vowel and consonants with a Ma-Ps field. The present embodiments can ensure physiological plausibility of sung performance by using pitch-dependent vowel profiles and vowel modification. Additionally, the present embodiments are advantageously animator-editable in a way that is bio-acoustically plausible.

While the present embodiments generally describe using Ja-Li-Ma-Ps parameters to animate singing, in other cases, the Ma parameter, the Ps parameter, or both, can be used with a different parameterized approach. In the case of Ja-Li parameters, lip-synchronization viseme action units can be determined by extracting jaw and lip motions for individual phonemes by blending corresponding visemes into co-articulated action units. In some cases, two or more viseme action units can be co-articulated such that the respective two or more visemes are approximately concurrent. In some cases, jaw (Ja) behavior and lip (Li) behavior can be captured as independent viseme shapes. As such, jaw and lip intensity can be used to modulate the blend-shape weight of the respective viseme shape. In this case, the viseme action units are a linear combination of the modulated viseme shape. In other words, the jaw contributions and the lip contributions can be respectively synchronized to independent visemes, and the viseme action units can be a linear combination of the independent visemes.

In some cases, viseme action units can be determined by manually setting jaw and lip values over time by a user. In other cases, the viseme action units can be determined by receiving lip contributions and having the jaw contributions be determined by determining the modulation of volume of input speech audio. In other cases, the lip contributions and the jaw contributions can be automatically determined from input speech audio and/or input speech transcript.

Mapping the phonemes to visemes can include at least one of mapping a start time of at least one of the visemes to be prior to an end time of a previous respective viseme and mapping an end time of at least one of the visemes to be after a start time of a subsequent respective viseme. In an example, a start time of at least one of the visemes is at least 120 ms before the respective phoneme is heard, and an end time of at least one of the visemes is at least 120 ms after the respective phoneme is heard. A start time of at least one of the visemes is at least 150 ms before the respective phoneme is heard, and an end time of at least one of the visemes is at least 150 ms after the respective phoneme is heard. In an example, viseme decay of at least one of the visemes can begin between seventy-percent and eighty-percent of the completion of the respective phoneme.

The Ja-Li viseme model can be driven by the directly observable bioacoustics of sound production using a mixture of diaphragm, jaw, and lip. The majority of variation in visual speech is accounted for by jaw, lip and tongue motion.

While trained ventriloquists are able to speak entirely using their diaphragm with little observable facial motion, most people typically speak using a mix of independently controllable jaw and lip facial action. The Ja-Li model simulates visible speech as a linear mix of jaw-tongue (with minimal face muscle) action and face-muscle action values. The absence of any JA (jaw) and LI (lip) action is not a static face but one perceived as poor-ventriloquy or mumbling. The other extreme is hyper-articulated screaming. The Ja-Li model is able to capture a broad variety of visually expressive speaking styles.

The Ja-Li can have visemes separated to capture sound production and shaping as mixed contribution of the jaw, tongue and facial muscles that control the lips. As such, the face geometry is a composition of a neutral face nface, overlaid with skeletal jaw and tongue deformation jd; td, displaced by a linear blend of weighted blend-shape action unit displacements au; thus, face=nface+jd+td+au.

To create a viseme within the 2D field defined by JA and LI for any given phoneme p, the geometric face(p) can be set for any point JA,LI in the viseme field of p to be:

$$face(p;JA; LI)=nface+JA*(jd(p)+td(p))+LI/*au(p)$$

where jd(p), td(p), and au(p) represent an extreme configuration of the jaw, tongue and lip action units, respectively, for the phoneme p. Suppressing both the JA and LI values here would result in a static neutral face, barely obtainable by the most skilled of ventriloquists. Natural speech without JA, LI activation is closer to a mumble or an amateur attempt at ventriloquy.

For an open-jaw neutral pose and 'ventriloquist singularity', a neutral face of the Ja-Li model is configured such that the character's jaw hangs open slightly and the lips are locked with a low intensity use of the "lip-tightening" muscle (Orbicularis oris), as if pronouncing a bilabial phoneme such as /m/. In some cases, three 'ventriloquist' visemes can be used: the neutral face itself (for the bilabials /b m p/), the neutral face with the orbicularis oris superior muscle relaxed (for the labiodentals /f v/), and the neutral face with both orbicularis oris superior and inferior muscles relaxed, with lips thus slightly parted (for all other phonemes). This 'Ventriloquist Singularity' at the origin of the viseme field (i.e. (JA, LI)=(0,0)), represents the lowest energy viseme state for any given phoneme.

For any given phoneme p, the geometric face for any point (p, JA, LI) is thus defined as:

$$face(p;JA;LI)=nface+JA*jd(p)+(vtd(p)+JA*td(p))+\\(vau(p)+LI*au(p))$$

where vtd(p) and vau(p) are the small tongue and muscle deformations necessary to pronounce the ventriloquist visemes, respectively.

For animated speech, the Ja-Li model provides a layer of speech abstraction over the phonetic structure. The Ja-Li model can be phonetically controlled by traditional keyframing or automatic procedurally generated animation. The Ja-Li viseme field can be independently controlled by an animator over time, or automatically driven by the audio signal. In an example, for various speaking styles, a single representative set of procedural animation curves for the face's phonetic performance can be used, and only the (JA,LI) controls are varied from one performance to the next.

For animation using the Ja-Li model, aligned phonemes are mapped to visemes. Viseme amplitudes are set (for articulation). Then, the visemes are re-processed for co-articulation to produce viseme timings and resulting animation curves for the visemes (in an example, a Maya MEL script of sparsely keyframed visemes). These phonetic animation curves can be outputted to demonstrate how the phonemes are changing over time.

The animated viseme values drive a viseme compatible rig. As an example, Ja-Li models can be used to animate the word "what". Before animation begins, the speech audio track must first be aligned with the text in the transcript. This can happen in two stages: phoneme parsing then forced alignment. Initially, the word 'what' is parsed into the phonemes: w 1UX t; then, the forced alignment stage returns timing information: w(2.49-2.54), 1UX(2.54-2.83), t(2.83-3.01). In this case, this is all that is needed to animate this word.

The speech animation can then be generated. First, 'w' maps to a 'Lip-Heavy' viseme and thus commences early; in some cases, start time would be replaced with the start time of the previous phoneme, if one exists. The mapping also ends late; in some cases, the end time is replaced with the end time of the next phoneme: ARTICULATE ('w', 7, 2.49, 2.83, 150 ms, 150 ms). Next, the 'Lexically-Stressed' viseme 'UX' (indicated by a '1' in front) is more strongly articulated; and thus power is set to 10 (replacing the default value of 7): ARTICULATE ('UX', 10, 2.54, 2.83, 120 ms, 120 ms). Finally, 't' maps to a 'Tongue-Only' viseme, and thus articulates twice: 1) ARTICULATE ('t', 7, 2.83, 3.01, 120 ms, 120 ms); and then it is replaced with the previous, which then counts as a duplicate and thus extends the previous, 2) ARTICULATE ('UX', 10, 2.54, 3.01, 120 ms, 120 ms).

Forced alignment can be used to align the speech audio to its phonemic transcript. This task can be performed, for example, by training a Hidden Markov Model (HMM) on speech data annotated with the beginning, middle, and end of each phoneme, and then aligning phonemes to the speech features. Several tools can be employed for this task; for example, Hidden Markov Model Toolkit (HTK), SPHINX, and FESTIVAL tools.

A facial rig can be animated by producing sparse animation keyframes for visemes. The timing of the viseme is determined by forced alignment after it has been processed through a co-articulation model. The amplitude of the viseme is determined by lexical and word stresses returned by a phonemic parser. The visemes are built on Action Units (AU), and can thus drive any facial rig (for example, simulated muscle, blend-shape, or bone-based) that has a Facial Action Coding System (FACS) or MPEG-4 FA based control system.

The amplitude of the viseme can be set based on two inputs: Lexical Stress and Word Prominence. These two inputs are retrieved as part of the phonemic parsing. Lexical Stress indicates which vowel sound in a word is emphasized by convention. For example, the word 'water' stresses the 'a' not the 'e' by convention. One can certainly say 'watER' but typically people say 'WAter'. Word Prominence is the de-emphasis of a given word by convention. For example, the 'of' in 'out of work' has less word prominence than its neighbours. In an example, if a vowel is lexically stressed, the amplitude of that viseme is set to high (e.g., 9 out of 10). If a word is de-stressed, then all visemes in the word are lowered (e.g., 3 out of 10), if a de-stressed word has a stressed phoneme or it is an un-stressed phoneme in a stressed word, then the viseme is set to normal (e.g., 6 out of 10).

For co-articulation, timing can be based on the alignment returned by the forced alignment and the results of the co-articulation model. Given the amplitude, the phonemeto-viseme conversion is processed through a co-articulation model, or else the lips, tongue and jaw can distinctly pronounce each phoneme, which is neither realistic nor expressive. Severe mumbling or ventriloquism makes it clear that coherent audible speech can often be produced with very little visible facial motion, making co-articulation essential for realism.

In the field of linguistics, "co-articulation" is the movement of articulators to anticipate the next sound or preserving movement from the last sound. In some cases, the representation of speech can have a few simplifying aspects. First, many phonemes map to a single viseme; for example, the phonemes: /AO/ (caught), /AX/ (about), AY/ (bite), and /AA/ (father) all map to the viseme AHH. Second, most motion of the tongue is typically hidden, as only glimpses of motion of the tongue are necessary to convince the viewer the tongue is participating in speech.

For the Ja-Li model, the model can be based on three anatomical dimensions of visible movements: tongue, lips and jaw. Each affects speech and co-articulation in particular ways. The rules for visual speech representation can be based on linguistic categorization and divided into constraints, conventions and habits.

In certain cases, there are four particular constraints of articulation:

1. Bilabials (m b p) must close the lips (e.g., 'm' in move);
2. Labiodentals (f v) must touch bottom-lip to top-teeth or cover top-teeth completely (e.g., 'v' in move);
3. Sibilants (s z J C S Z) narrow the jaw greatly (e.g., 'C' and 's' in 'Chess' both bring the teeth close together); and
4. Non-Nasal phonemes must open the lips at some point when uttered (e.g., 'n' does not need open lips).

The above visual constraints are observable and, for all but a trained ventriloquist, likely necessary to physically produce these phonemes.

In certain cases, there are three speech conventions which influence articulation:

1. Lexically-stressed vowels usually produce strongly articulated corresponding visemes (e.g., 'a' in water);
2. De-stressed words usually get weakly-articulated visemes for the length of the word (e.g., 'and' in 'cats and dogs'.); and
3. Pauses (, . ! ? ; : aspiration) usually leave the mouth open.

Generally, it takes conscious effort to break the above speech conventions and most common visual speaking styles are influenced by them.

In certain cases, there are nine co-articulation habits that generally shape neighbouring visemes:

1. Duplicated visemes are considered one viseme (e.g., /p/ and /m/ in 'pop man' are co-articulated into one long MMM viseme);
2. Lip-heavy visemes (UW OW OY w S Z J C) start early (anticipation) and end late (hysteresis);
3. Lip-heavy visemes replace the lip shape of neighbours that are not labiodentals and bilabials;
4. Lip-heavy visemes are simultaneously articulated with the lip shape of neighbours that are labiodentals and bilabials;
5. Tongue-only visemes (I n t d g k N) have no influence on the lips: the lips always take the shape of the visemes that surround them;
6. Obstruents and Nasals (D T d t g k f v p b m n N) with no similar neighbours, that are less than one frame in length, have no effect on jaw (excluding Sibilants);

7. Obstruents and Nasals of length greater than one frame, narrow the jaw as per their viseme rig definition;
8. Targets for co-articulation look into the word for their shape, anticipating, except that the last phoneme in a word tends to looks back (e.g., both /d/ and /k/ in 'duke' take their lip-shape from the 'u'.); and
9. Articulate the viseme (its tongue, jaw and lips) without co-articulation effects, if none of the above rules affect it.

In general, speech onset begins 120 ms before the apex of the viseme, wherein the apex typically coincides with the beginning of a sound. The apex is sustained in an arc to the point where 75% of the phoneme is complete, viseme decay then begins and then it takes 8 another 120 ms to decay to zero. In further cases, viseme decay can advantageously begin between 70% and 80% of the completion of the respective phoneme. However, there is evidence that there is a variance in onset times for different classes of phonemes and phoneme combinations; for example, empirical measurements of specific phonemes /m p b f/ in two different states: after a pause (mean range: 137-240 ms) and after a vowel (mean range: 127-188 ms). The Ja-Li model of the system and method described herein can advantageously use context-specific, phoneme-specific mean-time offsets. Phoneme onsets are parameterized in the Ja-Li model, so new empirical measurements of phonemes onsets can be quickly assimilated.

In some cases, where phoneme durations are very short, then visemes will have a wide influence beyond its direct neighbours. In some cases, visemes can influence mouth shape up to five phonemes away, specifically lip-protrusion. In an embodiment herein, each mouth shape can be actually influenced by both direct neighbours, since the start of one is the end of another and both are keyed at the point. In further cases, the second-order neighbours can also be involved since each viseme starts at least 120 ms before it is heard and ends 120 ms after. In the case of lip-protrusion, and it can be extended to 150 ms onset and offset. Another construction for bilabials and labiodentals can have a context specific onset. In this case, the onset can be dependent on the viseme being in the middle of a word/phrase or following a pause/period/punctuation.

For computing Ja-Li values, the Ja and Li parameters can be animated by examining the pitch and intensity of each phoneme and comparing it to all other phonemes of the same class uttered in a given performance.

In some cases, three classes of phonemes can be examined: vowels, plosives and fricatives. Each of these classes requires a slightly different approach of analysis to animate the lip parameter. Fricatives (s z f v S Z D T) create friction by pushing air past the teeth with either the lips or the tongue. This creates intensity at high frequencies, and thus they have markedly increased mean frequencies in their spectral footprints compared to those of conversational speech. If greater intensity is detected at a high frequency for a given fricative, then it is known that it was spoken forcefully and heavily-articulated. Likewise, with Plosives (p b d t g k), the air stoppage by lip or tongue builds pressure and the sudden release creates similarly high frequency intensity; whereby the greater the intensity, the greater the articulation.

Unlike fricatives and plosives, vowels are generally always voiced. This fact allows measurement of the pitch and volume of the glottis with some precision. Simultaneous increases in pitch and volume are associated with emphasis. High mean formant $F_0$ and high mean intensity are correlated with high arousal (for example, panic, rage, excitement, joy, or the like) which are associated with bearing teeth and greater articulation, and exaggerated speech. Likewise, simultaneous decreases are associated with low arousal (for example, shame, sadness, boredom, or the like).

In some cases, pitch and intensity of the audio can analyzed with a phonetic speech analyzer (for example, using PRAAT™). Voice pitch is measured spectrally in hertz and retrieved from the fundamental frequency. The fundamental frequency of the voice is the rate of vibration of the glottis and abbreviated as $F_0$. Voice intensity is measured in decibels and retrieved from the power of the signal. The significance of these two signals is that they are perceptual correlates. Intensity is power normalized to the threshold of human hearing and pitch is linear between 100-1000 Hz, corresponding to the common range of the human voice, and non-linear (logarithmic) above 1000 Hz. In a certain case, high-frequency intensity is calculated by measuring the intensity of the signal in the 8-20 KHz range.

In some cases, for vocal performances of a face that is shouting throughout, automatic modulation of the JA (jaw) parameter may not be needed. The jaw value can simply be set to a high value for the entire performance. However, when a performer fluctuates between shouting and mumbling, the automatic full Ja-Li model can be used by gathering statistics, mean/max/min and standard deviation for each, intensity and pitch and high frequency intensity.

Table 1 shows an example of how jaw values are set for vowels (the 'vowel intensity' is of the current vowel, and 'mean' is the global mean intensity of all vowels in a given audio sample):

TABLE 1

| Intensity of vowel vs. Global mean intensity | Rig Setting |
| --- | --- |
| vowel_intensity ≤ mean − stdev | Jaw(0.1-0.2) |
| vowel_intensity ≈ mean | Jaw(0.3-0.6) |
| vowel_intensity ≥ mean + stdev | Jaw(0.7-0.9) |

Table 2 shows an example of how lip values are set for vowels (the 'intensity/pitch' is of the current vowel, and 'mean' is the respective global mean intensity/pitch of all vowels in the audio clip):

TABLE 2

| Intensity/pitch of vowel vs. Global means | Rig Setting |
| --- | --- |
| intensity/pitch ≤ mean − stdev | Lip(0.1-0.2) |
| intensity/pitch ≈ mean | Lip(0.3-0.6) |
| intensity/pitch ≥ mean + stdev | Lip(0.7-0.9) |

Table 3 shows an example of how lip values are set for fricatives and plosives (the 'intensity' is the high frequency intensity of the current fricative or plosive, and 'mean' is the respective global mean high frequency intensity of all fricatives/plosives in the audio clip):

TABLE 3

| HF Intensity fricative/plosive vs. Global means | Rig Setting |
| --- | --- |
| intensity ≤ mean − stdev | Lip(0.1-0.2) |
| intensity ≈ mean | Lip(0.3-0.6) |
| intensity ≥ mean + stdev | Lip(0.7-0.9) |

The system and method, described herein, has a wide range of potential applications and uses; for example, in conjunction with body motion capture. Often the face and body are captured separately. One could capture the body and record the voice, then use the Ma-Ps-Ja-Li model to automatically produce face animation that is quickly synchronized to the body animation via the voice recording. This is particularly useful in a virtual reality or augmented reality setting where facial motion capture is complicated by the presence of head mounted display devices.

In another example of a potential application, the system and method, as described herein, could be used for media and video games. For example, in role playing games, where animating many lines of dialogue and/or singing is prohibitively time-consuming.

Other applications may become apparent.

Although the invention has been described with reference to certain specific embodiments, various modifications thereof will be apparent to those skilled in the art without departing from the spirit and scope of the invention as outlined in the claims appended hereto.

The invention claimed is:

1. A method of modulating animation curves based on audio input, the method executed on a processing unit, the method comprising:

identifying phonetic features by performing forced alignment to temporally align phonemes to the audio input in order to map a plurality of visemes to the audio input;

determining viseme animation curves based on parameters representing a spatial appearance of the plurality of visemes;

modulating the viseme animation curves based on melodic accent, pitch sensitivity, or both, the modulation uses the temporal alignment of the phonemes to modulate the temporal behavior of the visemes, melodic accent comprises a range of speech-like animation to animation with greater co-articulation between adjacent vowel visemes, pitch sensitivity comprises a parameterized range of syllabic to melismatic; and outputting the modulated animation curves.

2. The method of claim 1, wherein performing the forced alignment comprises using a trained language model that maps the audio input to phoneme timings.

3. The method of claim 1, further comprising identifying acoustic features in the audio input, and wherein modulating the viseme animation curves based on melodic accent, pitch sensitivity, or both, is based on the phonetic features and the acoustic features.

4. The method of claim 3, wherein identifying the acoustic features comprises identifying intervals of vibrato, constant pitch, or both, using a pitch signal.

5. The method of claim 4, wherein the intervals of vibrato are determined by locating intervals with periodic oscillation in the pitch signal.

6. The method of claim 1, wherein the melodic accent and the pitch sensitivity are used to modulate the viseme animation curves due to effects on boundary keys that demarcate lip movement before and after the phonation of the viseme and effects on internal keys that control lip movement during phonation.

7. The method of claim 1, wherein modulating the viseme animation curves comprises determining vowel-consonant co-articulation by extending boundary keys for closely spaced vowel visemes and then correcting conflicting keyframes.

8. The method of claim 1, wherein the pitch sensitivity is determined using a duration of a vowel relative to an average length of a spoken vowel.

9. The method of claim 1, wherein the melodic accent is determined using a spectral high-frequency (HF) energy relative to HF energy of consonants for an extended period.

10. A system for modulating animation curves based on audio input, the system comprising a processing unit and a data storage, the data storage comprising instructions for the processing unit to execute:

a tagging module to identify phonetic features by performing forced alignment to temporally align phonemes to the audio input for a plurality of visemes in the audio input;

a curve generation module to determine viseme animation curves based on parameters representing a spatial appearance of the plurality of visemes;

a blending module to modulate the viseme animation curves based on melodic accent, pitch sensitivity, or both, the modulation uses the temporal alignment of the phonemes to modulate the temporal behavior of the visemes, melodic accent comprises a range of speech-like animation to animation with greater co-articulation between adjacent vowel visemes, pitch sensitivity comprises a parameterized range of syllabic to melismatic; and an output module to output the modulated animation curves.

11. The system of claim 10, wherein performing the forced alignment comprises using a trained language model that maps the audio input to phoneme timings.

12. The system of claim 10, wherein the tagging module further identifies acoustic features in the audio input, and wherein modulating the viseme animation curves based on melodic accent, pitch sensitivity, or both, is based on the phonetic features and the acoustic features.

13. The system of claim 12, wherein identifying the acoustic features comprises identifying intervals of vibrato, constant pitch, or both, using a pitch signal.

14. The system of claim 13, wherein the intervals of vibrato are determined by locating intervals with periodic oscillation in the pitch signal.

15. The system of claim 10, wherein the melodic accent and the pitch sensitivity are used to modulate the viseme animation curves due to effects on boundary keys that demarcate lip movement before and after the phonation of the viseme and effects on internal keys that control lip movement during phonation.

16. The system of claim 10, wherein modulating the viseme animation curves comprises determining vowel-consonant co-articulation by extending boundary keys for closely spaced vowel visemes and then correcting conflicting keyframes.

17. The system of claim 10, wherein the pitch sensitivity is determined using a duration of a vowel relative to an average length of a spoken vowel.

18. The system of claim 10, wherein the melodic accent is determined using a spectral high-frequency (HF) energy relative to HF energy of consonants for an extended period.

\* \* \* \* \*